United States Patent Office 3,322,782
Patented May 30, 1967

3,322,782
1-CYANO-1,2,3-TRIAZOLES AND THEIR MIXTURES WITH α-DIAZO-N-CYANOIMINES
Frank Dennis Marsh, Wilmington, Del., assignor to E. I. du Pont de Nemours and Company, Wilmington, Del., a corporation of Delaware
No Drawing. Filed Oct. 9, 1964, Ser. No. 402,961
6 Claims. (Cl. 260—308)

This invention relates to, and has as its principal objects provision of, certain novel substituted triazoles and isomers thereof and the preparation of the same.

This application is a continuation-in-part of my copending application Ser. No. 234,878, filed Nov. 1, 1962, and now abandoned but refiled as application Ser. No. 383,233 on July 14, 1964.

*Warning.*—Cyanogen azide, a chemical employed in the immediate invention, is explosive when free, or nearly free, of solvent and should be handled with great care. It can be used, however, with comparative safety in dilute or moderately concentrated solution.

The triazoles of this invention are 1-cyano-1,2,3,-triazoles of the general formula:

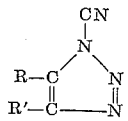

wherein

R and R' can be alike or different and are selected from the group consisting of hydrogen, alkyl, haloalkyl, nitroalkyl, cyanoalkyl or alkoxyalkyl of up to 12 carbon, cycloalkyl of up to 7 carbons or aryl of up to 8 carbons. R and R' together can also be a butadienylene group which with the $>C=C<$ moiety of the triazole nucleus forms a benzenoid group.

The novel isomers of these triazoles are open-chain diazo-N-cyanoimino forms which, in liquid state, at least, exist in equilibrium mixtures with the respective cyclic forms. The formula for the open-chain isomer can be written as

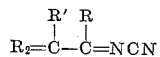

Both the cyclic and acylic isomers and the mixtures are part of this invention.

In one method for preparing the compounds of this invention, cyanogen azide is reacted with an acetylenic compound of the formula $RC\equiv CR'$ in the presence or absence of an inert, normally liquid, reaction medium. An overall equation for the reaction can be written as

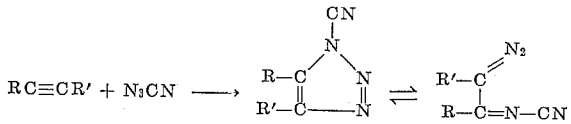

When R and R' are different, there are position isomers of both the triazole and open-chain isomers, a definite proportion of each isomer being formed in each instance. A formula for an equilibrium mixture of all the products can thus be written as

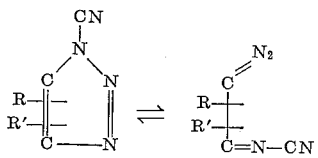

a formula indicating that any or all of the possible isomers are present.

Specific acetylenes of formula R–C≡C–R' usable in this process include acetylene itself, butyne-1 and -2, pentyne-1 and -2, hexyne-1, heptyne-1, octyne-1, octadecyne-1, dodecadecyne-1, cyclohexylacetylene, methylcyclohexylacetylene, phenylacetylene, 3-nitropropyne-1, 4-cyanobutyne-1, 5-hydroxypentyne-1, 3-methoxymethylpentyne-1, 4-chloropentyne-1, etc.

The cyanogen azide used in the reaction can be preformed or formed in situ. If preformed cyanogen azide is used, it can be prepared as follows:

A 125-ml. flask equipped with a condenser, thermometer, magnetic stirrer, gas inlet tube, and nitrogen bubbler is cooled to room temperature under nitrogen. Sodium azide (16.25 g., 0.25 mole) and dry acetonitrile (48.5 g., 62.5 ml.) are added and the flask is cooled to −10 to 0° C. in an ice-salt bath. Ice water or a coolant at −5 to 0° C. is circulated through the condenser and 20 ml. (24.0 g., 0.39 mole) of cyanogen chloride is distilled into the flask with good agitation at such a rate as to maintain a temperature below 12° C. After completion of the addition, the mixture is stirred for 0.5 hour at 0° to 10° C. and then allowed to warm slowly to room temperature over a period of one hour. Although the reaction is essentially complete at this point, the mixture can be stirred overnight at room temperature. Excess cyanogen chloride is removed by evacuation through the cooled condenser (0° C.) at 95–120 mm. pressure for about one hour, with stirring. The solution which remains in the flask is filtered under nitrogen and the filter cake washed twice with a total of 10 ml. of dry acetonitrile. The combined filtrate (67–72 ml.), which consists of a solution of cyanogen azide in acetonitrile, can be used directly or stored under nitrogen at −20° C. for subsequent use.

Cyanogen azide is shock-sensitive and to some extent thermally unstable. Its solutions in organic solvents, e.g., acetonitrile, ethyl acetate, or toluene, however, are stable for several days at room temperature and can be stored indefinitely at temperatures below 0° C. The temperature of storage should not be so low as to cause the solvent to solidify or to reduce the solubility of the cyanogen azide to the extent that it separates as a substantially solvent-free, shock-sensitive second phase. Preferred storage temperatures are −30° to 0° C.

Solutions containing up to 90% or even higher amounts of cyanogen azide in organic solvents can be prepared by the reaction of cyanogen chloride with either an alkali metal or ammonium azide as described above. However, solutions containing in the neighborhood of 20 to 40% by weight of cyanogen azide are preferred for convenience of handling and safety.

Because of the relative instability of cyanogen azide, it is best to generate it in the presence of the acetylenic compound coreactant, or in the presence of an inert reaction medium. In the latter procedure, the acetylenic compound can be added to the inert reaction medium which contains preformed cyanogen azide. Alternatively, the cyanogen azide solution can be added to the acetylenic compound coreactant.

The cyanogen azide and acetylenic compound can be employed in essentially equimolar proportions or one of the other can be used in excess.

When the acetylenic compound is a liquid under the conditions of reaction, it can be used as a reactant and reaction medium. A separate reaction medium can optionally be used, however, and, when used, should be one which is normally liquid and relatively inert toward the reactants and reaction products at the reaction temperature used. Suitable reaction media are acetonitrile, propionitrile, carbon tetrachloride, ethyl acetate, tetranitromethane, dimethylformamide, 1,1,2,2-tetrachloroethane, methylene chloride, 1,2-dibromoethane, etc.

The particular temperature conditions employed in this process have as their limiting factor the rate of decomposition of the cyanogen azide. Since consideration of the formula of the products shows that all of the nitrogens of the N₃CN remain, it is clear that the undecomposed cyanogen azide is the reacting species. The rate of reaction with the acetylenic reactant is reasonably rapid at 50° C. or below because the rate of decomposition of N₃CN does not become appreciable until temperatures substantially above 50° C., e.g., 60° C., are reached. This temperature is therefore, for practical purposes, the useful upper limit of temperatures at which the process leading to the products of this invention can be carried out. The lower temperature depends upon the particular acetylene being reacted. As a rule, a practical lower temperature is −15° C. In general, however, the best results are obtained at temperatures of from 0° to 55° C. and this constitutes the preferred range of operation.

Pressure is not a critical variable and the process will generally be carried out under autogenous pressures. Depending upon the volatility of the reactants, slightly elevated pressures can be used.

The time of reaction is variable and can be from a few minutes with highly reactive acetylenic compounds to several hours for less reactive acetylenes. An alternative process for preparing the products of this invention, and one which is useful in the synthesis of 1-cyano-substituted benzo-1,2,3-triazoles, consists in reacting a preformed benzo-1,2,3-triazole with an alkali metal hydride followed by cyanogen chloride. Generally the benzotriazole is dissolved in a suitable solvent and added to a suspension of the alkali metal hydride in an inert reaction medium, followed by addition of cyanogen chloride or bromide in incremental amount with thorough agitation between additions.

The reaction between the benzo-1,2,3-triazole and sodium hydride followed by cyanogen chloride is carried out at temperatures of from 20° to 50° C. In order to maintain proper temperature control, it is desirable, however, to add the cyanogen chloride to the benzotriazole salt in incremental amounts and to cool after each addition.

Usually, the benzotriazole, alkali metal hydride, and cyanogen chloride are reacted in 1:1:1 molar amounts. If desired, however, amounts outside these mole ratios can be used. Thus, the benzotriazole or the alkali metal hydride and cyanogen chloride can be used in excess.

Suitable alkali metal hydrides are sodium, potassium, lithium and cesium hydrides. Of these, the preferred is sodium hydride because of its ready availability and low cost, as compared to the other alkali metal hydrides.

The 1-cyano-benzo-1,2,3-triazoles can also be made by reacting the appropriate benzyne with cyanogen azide. In this reaction, the benzyne is formed in the reaction medium in the presence of the cyanogen azide. Benzyne is a known compound which can be made by reacting anthranilic acid with an alkyl nitrite in an aprotic medium (J. Am. Chem. Soc., 85, 1549 (1963)).

The products of this invention are useful in image formation. For example, photolysis through a film positive placed on paper or other bibulous substrate which has been coated with a triazole of this invention gives a clear, negative image.

The examples which follow are submitted to illustrate and not to limit this invention.

EXAMPLE 1

*1-cyano-1,2,3-triazole and α-diazo-N-cyanoacetaldimine*

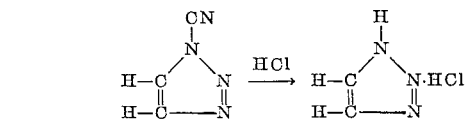

A 240-ml. "Hastelloy" C-lined pressure tube was charged with 13.6 g. (0.20 mole) of sodium azide and 52 ml. of acetonitrile, cooled to −80° C., and then 24 g. (0.38 mole) of cyanogen chloride and 7 g. (0.27 mole) of acetylene were pressured thereinto. The sealed vessel was shaken for 20 hours at 45° C., cooled and vented, the solids were removed by filtration, and the liquid solution was treated with 5 g. of activated carbon at 50° C. for 5 minutes, filtered through diatomaceous earth and concentrated. The semicrystalline residue which remained was sublimed at 0.5 mm. and 20° C. to give 7.95 g. (42%) of a mixture of 1-cyano-1,2,3-triazole, M.P. 33° C., and the open-chain isomer α-diazo-N-cyanoethylideneimine.

*Analysis.*—Calcd. for $C_3H_2N_4$: C, 38.3; H, 2.1; N, 59.6. Found: C, 38.3, 38.4, 38.6; H, 2.4, 2.4, 2.3; N, 59.3, 59.3.

The n-m-r spectrum showed two bands of equal weight at $\tau=1.77$, 2.58. The low field absorption has $J=2$ cps., but the high field band is quite diffuse.

The infrared spectrum of the mixture shows absorption at 6.40μ and a complex band showing three peaks at 4.43 (s),[1] 4.59 (m),[1] and 4.71 (s) μ.

*Hydrolysis to triazole hydrochloride.*—The experiment which follows shows the presence of the triazole ring in the above product:

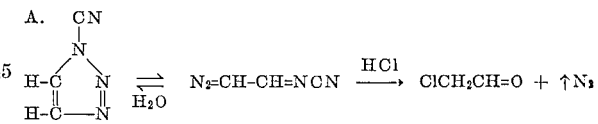

Hydrogen chloride was passed into a yellow solution of 1.60 g. (0.017 mole) of the product of Example 1 in ethanol. An immediate reaction ensued giving a colorless solution. On evaporation of the solvent, 2.10 g. of hygroscopic crystals remained. Recrystallization of 0.95 g. from acetone afforded 0.55 g. of crystals, M.P. 142.4–144.8° C., identified as 1,2,3-triazole hydrochloride [lit. reported M.P. 142° C., R. Huttel and G. Wetzel, Ann., 593, 207 (1955)].

*Analysis.*—Calcd. for $C_3H_4N_3Cl$: C, 22.8; H, 3.8; N, 39.8. Found: C, 23.2; H, 4.0; N, 39.2.

*Proof of open-chain structure.*—In order to establish that in solution the 1-cyano-1,2,3-triazole is present in its open-chain isometric form, i.e., as α-diazo-N-cyanoethylideneimine, the following experiments were carried out:

A.

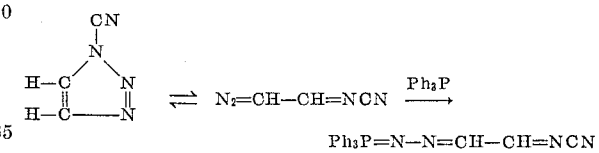

To 15 ml. of concentrated hydrochloric acid was added 2.0 g. (0.021 mole) of 1-cyano-1,2,3-triazole, prepared as in Example 1. After 2 hours at room temperature, 500 ml. (93%) of nitrogen had evolved. The resulting solution was subjected to ether extraction continuously for 16 hours, whereupon gas-liquid-chromatographs (g.l.c.), showed the presence of chloroacetaldehyde in the ether (identical retention time). On treatment of this ether solution with 2,4-dinitrophenylhydrazine, a small amount of an orange hydrazone, M.P. 157.5–160° C., was obtained.

*Analysis.*—Calcd. for $C_8H_7ClN_4O_4$: C, 37.2; H, 2.7. Found: C, 37.8, 37.9; H, 3.1, 3.2.

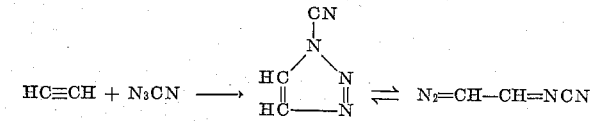

A solution of 0.88 g. (9.4 mmoles) of 1-cyano-1,2,3-triazole, prepared as above in 75 ml. of ether was treated with 2.6 g. (9.9 mmoles) of triphenyl phosphine in 50 ml. of ether. A yellow crystalline adduct, 1-(triphenylphosphinatodiazo)-2-(N-cyanoimino)ethane, soon separated, without nitrogen evolution. A total of 3.05 g. (86%) was obtained, M.P. 114–115° C. dec.

---

[1] The symbol "s" means strong and the symbol "m" means medium.

EXAMPLE 2

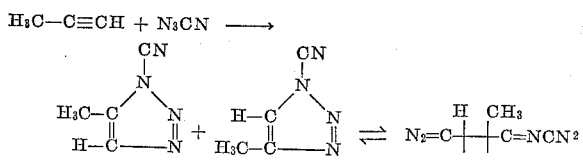

A mixture of 8.8 g. (0.135 mole) of sodium azide, 35 ml. of acetonitrile and 10 g. (0.25 mole) of propyne was sealed in a 240 ml. "Hastelloy" C-lined tube and 16 g. (0.26 mole) of cyanogen chloride was added. The vessel was shaken for 20 hours at 45° C. and the contents discharged, and filtered to remove salts. The resulting solution was treated with a small amount of activated carbon at 45° C. and filtered through diatomaceous earth. The solvent was removed from the resulting clear solution and the remaining oil was distilled through a short-path still to give 5.0 g. (35%) of a mixture of 1-cyano-4-methyl- and 1-cyano-5-methyl-1,2,3-triazole, boiling at a pot temperature of 63–72° C./0.3–0.5 mm., $n_D^{25}$ 1.5142–1.5360, and the open-chain isomer, α-diazo-N-cyanopropylideneimine, and N-cyano-1-methyl-2-diazoethylideneimine.

*Analysis.*—Calcd. for $C_4H_4N_4$: C, 44.4; H, 3.7; N, 51.9. Found: C, 44.9, 45.3; H, 4.0, 4.1; N, 51.9, 52.0.

The n-m-r spectrum showed two peaks attributable to the methine group at $\tau=1.81$ and 3.10. As in the acetylene case, the higher positioned of these two bands is broadened. From the spectrum of the crude product, the isomer ratio is seen to be close to 70:30.

The >C=N— band is at 6.50μ. Again the —C≡N region is quite complex with bands at 4.45, 4.61, and 4.75μ.

EXAMPLE 3

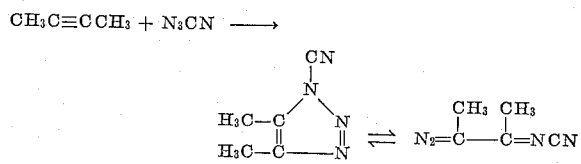

To a mixture of 8.8 g. (0.135 mole) of sodium azide in 35 ml. of acetonitrile in an 80-ml. "Hastelloy" C-lined pressure tube was added 16 g. (0.26 mole) of cyanogen chloride and 14.5 g. (0.27 mole) of 2-butyne. After sealing the tube and shaking for 20 hours at 45° C., the contents were filtered to remove sodium chloride and the resulting solution was heated for 10 minutes at 50–55° C. with activated carbon and filtered through diatomaceous earth. The solvents were removed on a rotating evaporator and the residue was distilled at 50–65° C./0.4 mm. in a short-path still. The product crystallized in a condenser at −15° C. and a total of 2.20 g. (13%) of 1-cyano-4,5-dimethyl-1,2,3-triazole and its open-chain isomer, N-cyano-1-methyl-2 - diazopropylideneimine, was obtained.

*Analysis.*—Calcd. for $C_5H_6N_4$: C, 49.1; H, 5.0; N, 44.9. Found: C, 48.9, 48.9; H, 5.3, 5.2; N, 43.8, 43.5, 43.6.

The n-m-r spectrum showed two unsplit methyl resonance lines at $\tau=7.82, 7.98$.

EXAMPLE 4

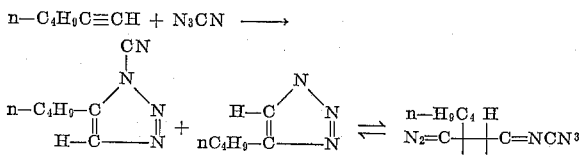

---

[2] The last formula indicates that a mixture of the open-chain isomers of the 4- and 5-methyl substituted triazoles is obtained.

[3] The last formula indicates that a mixture of the open-chain isomers of the 4- and 5-n-butyl substituted triazoles is obtained.

To a solution of cyanogen azide prepared from sodium azide (6.5 g., 0.1 mole) and cyanogen chloride (50 ml., 61 g., 1 mole) there was added, during 22 hours, 75 ml. of 1-hexyne. The mixture was refluxed under nitrogen against a water-cooled condenser for 1.5 hours, during which time the temperature gradually rose from 16° to 35° C., as excess cyanogen chloride distilled from the mixture. The mixture was then stirred at room temperature for 16 hours and finally heated to 64° C. during 3.5 hours. Sodium chloride was removed by filtration after diluting the mixture with a little ether. The solvent and excess hexyne-1 were removed from the filtrate on a rotary evaporator at 0.3 mm. and 45° C. There remained a red-brown mobile oil (13.7 g., 91% yield). Distillation of this oil through a short-path still at 0.5 mm. and a bath temperature of 79–85° C. gave four fractions (10.9 g., 72% yield) of a mixture of 1-cyano-4-butyl-1,2,3-triazole and the corresponding 5-butyl isomer and the open-chain N-cyano-α - diazohexylideneimine and 2-N-cyanoimino-1-diazohexane having refractive indices at 25° C. ranging from 1.4921 to 1.4927.

*Analysis.*—Calcd. for $C_7H_{10}N_4$: C, 55.98; H, 6.71; N, 37.30. Found: C, 56.15, 56.26; H, 6.63, 6.95; N, 37.47, 37.50.

Proton magnetic resonance showed a pattern characteristic for the normal butyl group and two unsplit peaks at $\tau=1.53$ and $\tau=2.55$ in a 1:6 ratio. The infrared spectrum showed absorption at 3.2 (=CH), three peaks in the nitrile region at 4.45μ, 4.60μ, 4.75μ and two peaks at 6.15μ and 6.55μ.

EXAMPLE 5

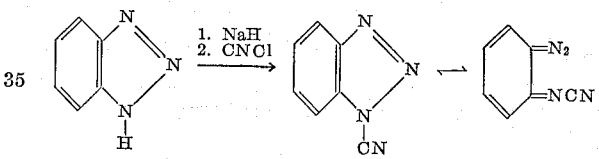

A solution of 23.8 g. (0.20 mole) of benzotriazole in tetrahydrofuran was added to 9 g. of 53.5% sodium hydride (0.2 mole) in mineral oil suspended in 150 ml. of tetrahydrofuran. The solution was stirred for one hour, then 16 g. of cyanogen chloride was added at the rate of 1 g./min. The temperature was kept below 40° C. with cooling.

After standing for one hour, the solution was filtered and the solvent was evaporated to give an oil which was sublimed at 75° C./2μ to give 19.3 g. (67%) of 1-cyanobenzotriazole, M.P. 73–75° C. Solutions of this compound in polar solvents are yellow and the ultraviolet spectra in cyclohexane and ethanol show differences; the appearance of a visible band at 435mμ in ethanol indicates a highly conjugated species is present, which is absent in cyclohexane solution.

*Analysis.*—Calcd. for $C_7H_4N_4$: C, 58.3; H, 2.8; N, 38.9. Found: C, 58.2, 58.5; H, 3.0, 3.0; N, 39.2, 39.5.

$$U.V. \lambda_{EtOH}^{max.} \ 435 \ m\mu, \ K=0.02$$
$$293 \ m\mu, \ K=22.9$$
$$253 \ m\mu, \ K=46.0$$

$$U.V. \lambda_{cyclohexane}^{max.} \ 293 \ m\mu, \ K=24.8$$
$$258 \ m\mu, \ K=39.1$$
$$249 \ m\mu, \ K=51.8$$

Infrared 4.45μ C≡N.

No indication of 2-cyanobenzotriazole was found.

EXAMPLE 6

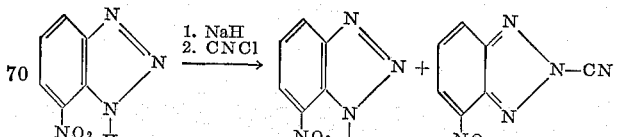

A solution of 16.4 g. (0.10 mole) of 4-nitrobenzotriazole in 120 ml. of tetrahydrofuran was added to 4.5 g.

of sodium hydride-mineral oil dispersion containing 0.10 mole of hydride. After one hour, 14.5 g. cyanogen chloride was added over ½ hour period as the temperature rose to 45° C. The solution was filtered and the tetrahydrofuran was removed by evaporation. The residue was recrystallized from 90 ml. of 2:1 benzene:cyclohexane to give 14.5 g. (77%) of a mixture of 1-cyano-7-nitro-1,2,3-benzotriazole and 2-cyano-7-nitro-2,1,3-benzotriazole, M.P. 98–99° C. Chromatography of this mixture on alumina caused hydrolysis to nitrobenzotriazole, M.P. 98–99° C.

Four grams of the mixture was recrystallized from 75 ml. of the benzene-cyclohexane solution to give 1.54 g. of pure 1-cyano-7-nitrobenzo-1,2,3-triazole, M.P. 123–124° C.

*Analysis.*—Calcd. for $C_7H_3N_5O_2$: C, 44.5; H, 1.6; N, 37.0. Found: C, 45.5, 45.8; H, 1.9, 2.0; N, 36.5, 36.6.

U.V. $\lambda_{EtOH}^{max.}$ 285 m$\mu$, K=38.4
  250 m$\mu$, K=36.2

*Example 7*

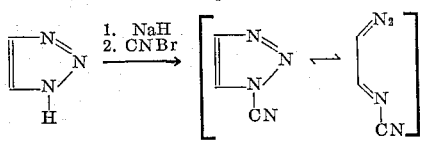

A a solution of 7.6 g. of 1,2,3-triazole (0.11 mole) in 120 ml. of tetrahydrofuran was added to 4.5 g. of 53.5% sodium hydride in mineral oil and the mixture was stirred for three hours. A solution of 12 g. of cyanogen bromide (0.11 mole) in 100 ml. of acetonitrile was added and an exothermic reaction took place. After one hour, the reactant mixture was filtered through diatomaceous earth and the red solution thus obtained was placed on a rotating evaporator and solvents were removed under vacuum. Examination of the remaining oil by infrared spectroscopy showed the presence of the $C_3H_2N_4$ mixture, which reacted with triphenylphosphine to give the phosphazene:

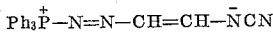

thereby confirming the presence of the 1-cyanotriazole: N-cyano-α-diazoethylidenimine mixture.

The experiments which follow illustrate the utility of the products of this invention in image formation:

(A) A solution of 1-cyano-7-nitrobenzotriazole, prepared as in Example 6, in benzene was sprayed onto an unsized paper sheet and the treated paper dried. After drying the paper was irradiated through a film positive for 5 minutes with an RS sun lamp. A clear negative image was formed on the paper.

(B) A benzene solution of the 1-cyano-1,2,3-triazole of Example 1 was sprayed onto unsized paper. After evaporation of the benzene solvent the paper was irradiated through a film positive for 5 minutes with an RS sun lamp. A clear negative image was formed on the paper.

Since obvious modifications and equivalents in the invention will be evident to those skilled in the chemical arts, I propose to be bound solely by the appended claims.

The embodiments of the invention in which an exclusive property or privilege is claimed are defined as follows:

1. A composition of matter of the formula

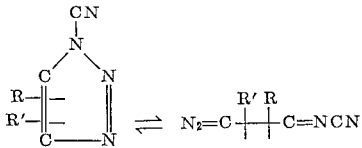

wherein R and R' are selected from the group consisting of hydrogen, alkyl, haloalkyl, nitroalkyl, cyanoalkyl and alkoxyalkyl of up to 12 carbons, cycloalkyl of up to 7 carbons, aryl of up to 8 carbons and butadienylene.

2. A composition of matter of the formula

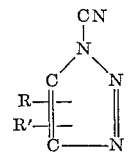

wherein R and R' are selected from the group consisting of hydrogen, alkyl, haloalkyl, nitroalkyl, cyanoalkyl and alkoxyalkyl of up to 12 carbons, cycloalkyl of up to 7 carbons, aryl of up to 8 carbons and butadienylene.

3. A composition of matter of the formula

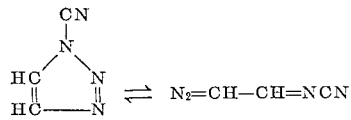

4. A composition of matter of the formula

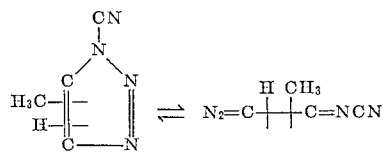

5. A composition of matter of the formula

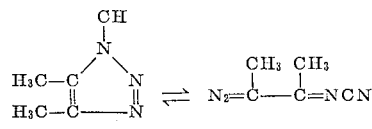

6. A composition of matter of the formula

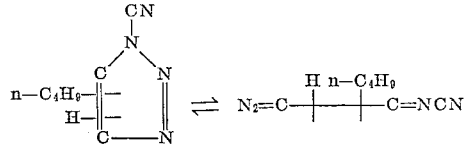

References Cited

Benson et al.: Chem. Reviews, vol. 46 (1950), pp. 8, 9, 10, 11, 13, 24, 25 and 29.

Boyer et al.: Chem. Reviews, vol. 54 (1954), pp. 44–45.

Migrdichian: Chemistry of Organic Cyanogen Compounds, 1947, pp. 303–4.

ALEX MAZEL, *Primary Examiner.*

RICHARD J. GALLAGHER, *Assistant Examiner.*